A. T. KASLEY.
HEAT ENGINE.
APPLICATION FILED JULY 5, 1913.
1,231,376.
Patented June 26, 1917.
3 SHEETS—SHEET 3.
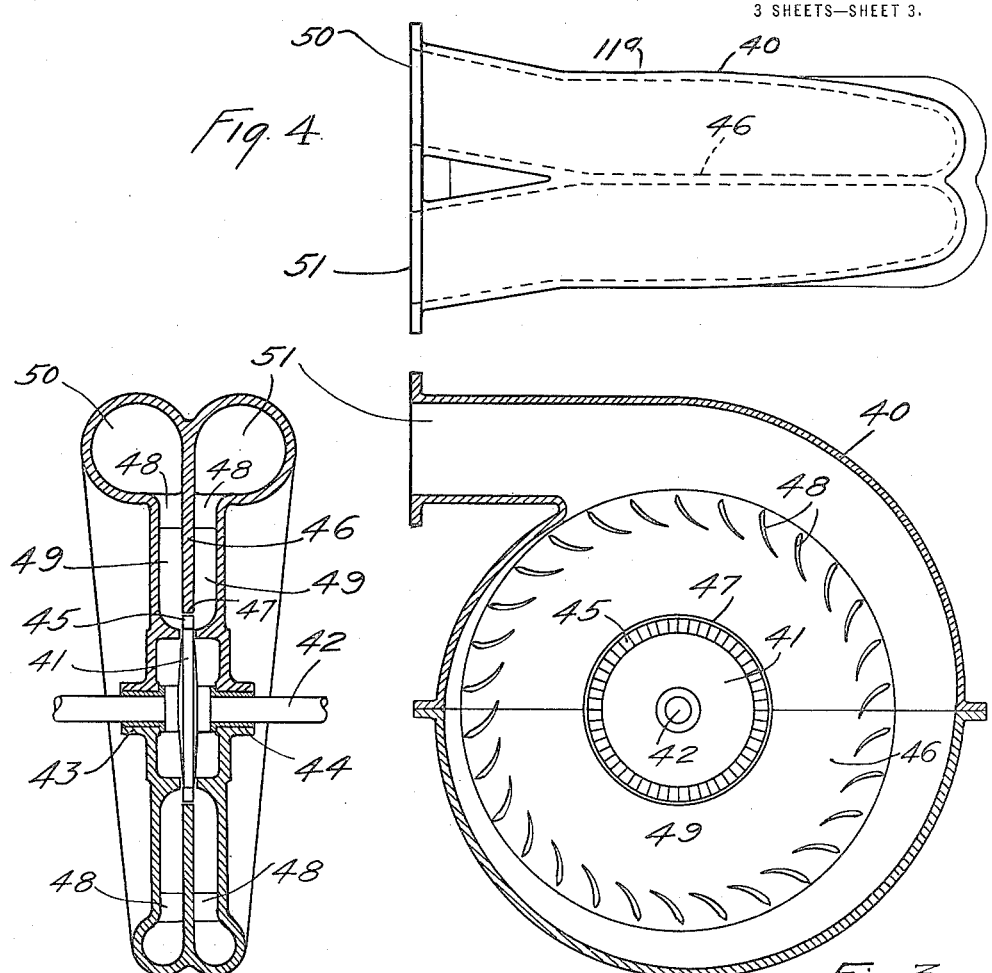
Fig. 4.
Fig. 5.
Fig. 3.
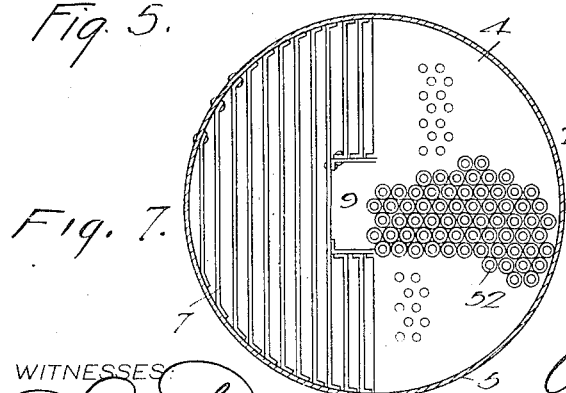
Fig. 7.
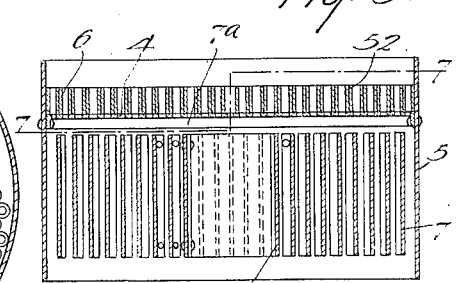
Fig. 6.
INVENTOR.
Alexander T. Kasley.
WITNESSES
BY
HIS ATTORNEY IN FACT

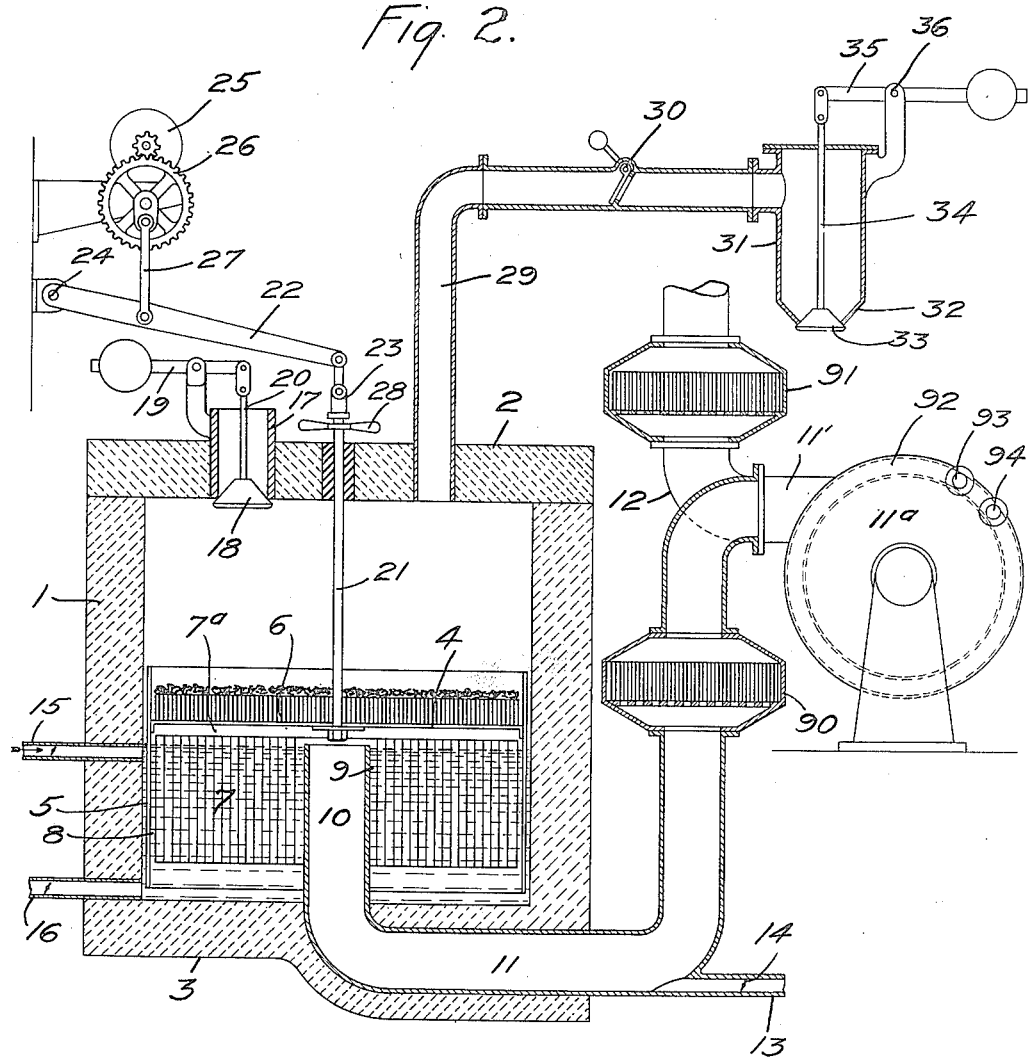

UNITED STATES PATENT OFFICE.

ALEXANDER T. KASLEY, OF SWISSVALE, PENNSYLVANIA.

HEAT-ENGINE.

1,231,376.  Specification of Letters Patent.  Patented June 26, 1917.

Application filed July 5, 1913. Serial No. 777,432.

*To all whom it may concern:*

Be it known that I, ALEXANDER T. KASLEY, a citizen of the United States, and a resident of Swissvale, in the county of Allegheny and State of Pennsylvania, have made a new and useful Invention in Heat - Engines, of which the following is a specification.

This invention relates to hot air engines. Prior to my invention, engines operated by hot air had been employed, although the prohibitive cost (due in part to the expense of casting and machining the large cylinders, which have hitherto been considered essential) and their low practical efficiency have materially restricted their application.

In those engines most generally used, large regenerators have been employed with large clearance volume relative to the displacer cylinder, or if the passages were small, considerable power was required to pass the air through the regenerator.

Recognizing the above enumerated disadvantages, as well as others, I have produced a new hot air engine, in which I may dispense with the expensively large and accurately machined cylinders. As a result I have eliminated the excessive first cost, as well as the cost due to replacing warped cylinders, an objection quite common in engines of this class.

In the form of my invention shown, means are also provided for minimizing the loss of heat by conduction, and this may be accomplished by making the regenerator of material having poor heat conductivity.

I may also employ my invention in connection with temperature reducing means, as, for example, in the art of refrigeration.

Other advantages and objects of my invention, as well as the novel details of construction, will be specifically referred to hereinafter, it being understood that changes in form, proportion and minor details of construction will be resorted to, without departing from the spirit of my invention, or sacrificing any of the advantages thereof.

In the drawings.

Fig. 2 is a diagrammatic view, shown partially in section and partially in elevation, of a modified form of apparatus embodying my invention;

Fig. 3 is a transverse sectional view of a turbine which forms a detail of the apparatus illustrated as an embodiment of the invention;

Fig. 4 is a plan view of the turbine illustrated in Fig. 3;

Fig. 5 is a longitudinal vertical section of the turbine illustrated in Figs. 3 and 4;

Fig. 6 illustrates a vertical section of a displacer forming a detail of the apparatus, illustrated as embodying the present invention, and shows the regenerator and heat-conducting elements; and Fig. 7 is a fragmentary cross-sectional view on the broken line 7—7 of Fig. 6.

Figure 1:
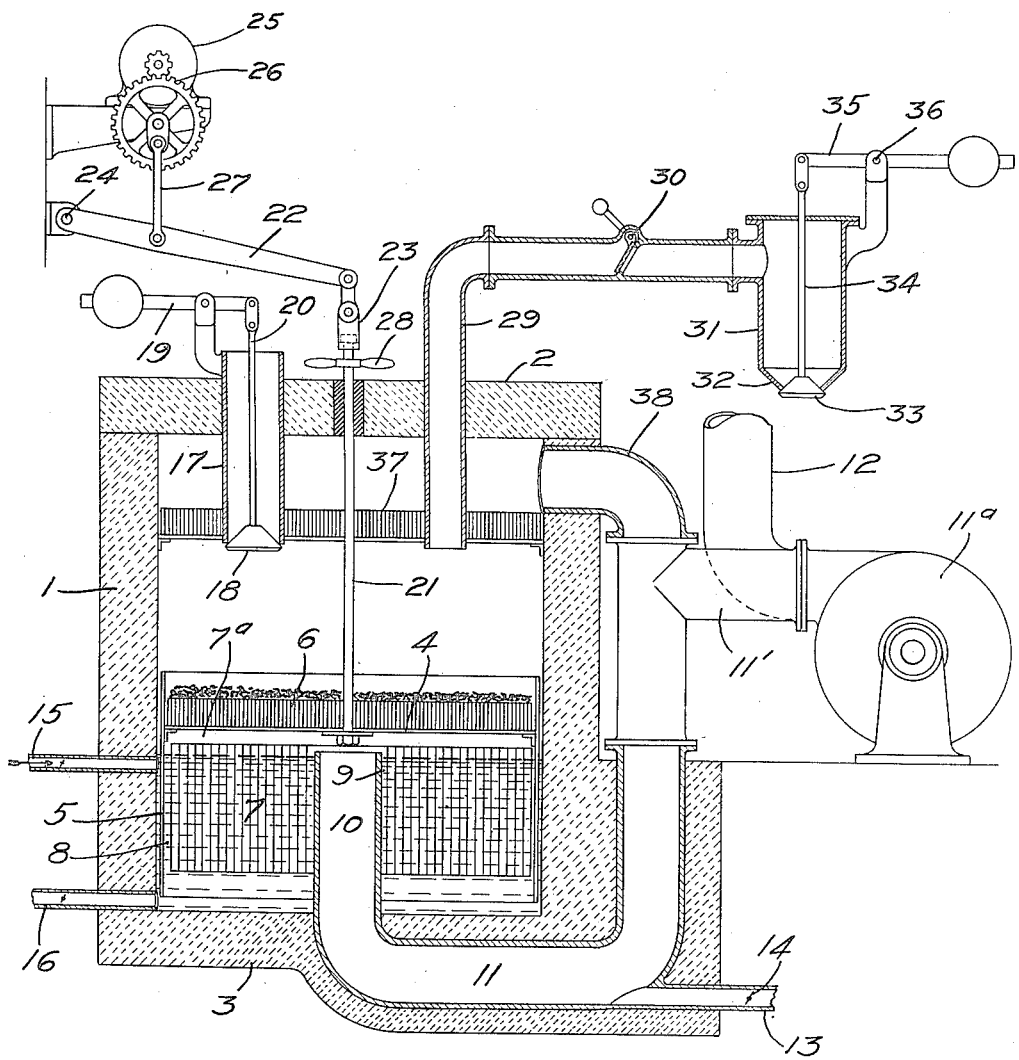
Figure 1 is a diagrammatic illustration, shown partially in section and partially in elevation, of one form of apparatus embodying the present invention.

In Fig. 1, I have shown a closed displacer chamber which may be of any desired form, but which is here shown cylindrical, with vertical wall 1, top 2, and bottom 3.

Within the chamber is a displacer, comprising a perforate plate 4, surrounded by an annular flange 5, which extends for a considerable depth within the chamber to form a water seal, as will be presently explained.

Mounted on the plate 4 is a regenerator 6 which may be of any form, but preferably is constructed so that it embodies the features of the apparatus illustrated in Figs. 6 and 7. As illustrated, the regenerator comprises a series of short tubes 52, which are preferably made of fire clay or some other material of low conductivity and are arranged as shown in Fig. 7 so that their axes extend vertically. With such a construction a relatively large heat-absorbing and radiating surface is provided, because the inner and outer walls of the tubes 52 are exposed to the action of the air passing through the regenerator. Below the regenerator and spaced from it is a series of conductors 7, which serve as cooling elements and which may consist of plates suitably secured to the depending flange 5 with which the plate 4 is provided. These plates or conductors 7 extend vertically so that they may be introduced into and be withdrawn from the sealing water, contained within the displacer chamber, without offering material resistance to the motion of the displacer. An air space 7ª is preferably maintained between the upper edges of the plates or conductors 7 and the regenerator.

The level of the sealing water, contained within the lower portion of the displacer chamber, is maintained slightly below the upper edges of the plates 7 when the displacer occupies its lowermost position. Projecting upwardly through the bottom of the displacer chamber and through the sealing water is a conduit or pipe 10 which terminates at its upper end above the level of the sealing water and therefore communicates with the interior of the chamber. As shown in Figs. 6 and 7, the plates 7 are so arranged on the displacer that a space 9 is provided into which the pipe 10 projects when the displacer is in its lowermost position. The pipe 10 communicates with the conduit 11 which in turn communicates with a motor 11ª here shown as a turbine. The turbine also communicates with the atmosphere through a pipe 12. A drain pipe 13 communicates with the conduit 11 and is provided with a valve 14 for closing direct communication between the conduit and the atmosphere. Water is delivered to the water seal through a valved pipe 15 and is discharged from the seal through a drain pipe 16 which is also provided with a valve.

Extending through the top 2 of the displacer chamber is a fuel inlet 17, having a valve 18 counterbalanced by a weighted lever 19, connected to the stem 20 of said valve.

Projecting through the top 2 is a rod 21, one end of which is connected to the displacer and the other end to a lever 22, by a swivel and link connection 23.

The lever 22 is pivoted at 24 to a suitable support and it is rocked by a motor 25, through a gearing 26 and the link 27. The rocking of the lever will be effective in imparting a reciprocatory motion to the displacer in the chamber, and if desired the displacer may be given a rotary motion by turning the rod 21 through the medium of the handle 28, the rotation of the displacer being sometimes desirable to evenly distribute the fuel over the top of the regenerator 6. 29 is an ash offtake consisting of a pipe or conduit having a weighted valve 30 therein and connected to a vacuum discharge chamber 31, the discharge end 32 of which is provided with a valve 33, the stem 34 of which extends through the top of the chamber and is connected to the weighted lever 35, fulcrumed at 36.

In Fig. 1, I have shown a supplemental regenerator 37, between the regenerator 6, and the top 2 of the displacer chamber, which may be employed under conditions where it is desirable to increase the efficiency of the apparatus over that obtained by the use of a single regenerator. I have also shown a supplemental conduit 38 complementary to the conduit 11 and leading from the top of the displacer chamber to the conduit 11, and into the motor 11ª. This conduit 38, however, will not be used when the regenerator 37 is not employed.

In Figs. 3 to 5, inclusive, I have shown a preferred form of turbine, consisting of a casing 40, having a turbine wheel 41 therein on the shaft 42, in bearings 43 and 44. On the periphery of the wheel are radial blades or buckets 45. The casing 40 is divided by a partition 46, the inner edge 47 of which surrounds the periphery of the row of blades. Spaced away from the blades 45, are directing vanes 48 to provide whirl chambers 49, on opposite side of the partition. One side of the turbine casing, as, for example, 50 is connected to the conduit 11, while the other side 51, communicates with the atmosphere through conduit 12 as best seen in Fig. 1.

With the parts assembled as described and with the water in the lower portion of the displacer chamber for the purpose of forming a seal between the displacer and the walls of the chamber, the operation of the apparatus is as follows:

After the fire is started on the regenerator and the combustion of the fuel is well under way the motor 25 is started. As the displacer moves upwardly the air within the displacer chamber passes downwardly through the fuel bed, through the regenerator 6 and eventually through the cooling conductors 7. It therefore first takes heat from the fuel bed; then imparts a portion of the heat to the regenerator and is finally cooled by the conductors 7. This cooling of the air causes a drop in pressure within the displacer chamber and consequently causes air to rush in to the chamber through the pipe 12, the turbine 11ª, the conduit 11', and the branch conduits 11 and 38. As the air passes through the turbine it drives the turbine. As the displacer moves downwardly the air within the chamber is heated by reason of the fact that it is caused to pass through the regenerator 6 and also the fuel bed, and consequently a rise in pressure within the chamber accompanies the rise in temperature of the air. This rise in pressure causes air to rush out of the displacer chamber through the conduits 11 and 38 and consequently through the pipe 11', the turbine 11ª, and the pipe 12. Inasmuch as the blades on the rotor of the turbine are symmetrically located with relation to the pipes 11' and 12, the turbine will be driven in the same direction by this reversal in the flow of air through it. The air leaving the displacer chamber through the conduit 11 must first pass through the regenerator 6, where it gives up a portion of its heat, and the air leaving the chamber through the conduit 38 must first pass through the regenerator 37 where it gives up a portion of its heat. In this way heat is conserved and consequently the air entering the chamber through either of the conduits will at some time during the cycle of the engine be exposed to the heat of one or the other of the regenerators.

When it is desired to replenish the fuel, the fuel hopper 17, may be opened and the fuel dropped upon the regenerator 6, said regenerator being turned by the handle 28 to insure an even distribution of the fuel thereover. Inasmuch as the valve 30 within the piping 29 is a check valve responsive to an excess of pressure within the chamber 31 over that existing within the displacer chamber, the pressure within the chamber 31 will normally be equal to the lowest pressure which exists within the displacer chamber during the cycle of the engine, consequently ash may be discharged from the displacer chamber into the chamber 31 when the displacer occupies its uppermost position by merely opening the valve 30. This will occasion a rush of air from the displacer chamber into the chamber 31 and the entire fuel bed may be purged of ash by rotating the displacer at the time of opening the valve 30. The ash is discharged from the chamber 31 by opening the valve 33 after the valve 30 is closed.

The motor 25 may receive power from any suitable source as, for example, from a generator run from the turbine if desired. In starting, it may be turned by hand, or by a storage battery.

It will be appreciated that a device constructed in accordance with my invention requires no cast cylinders which need to be machined. On the contrary metal cylinders may be eliminated, and a built up displacer chamber may be substituted and this chamber may be made of concrete or any suitable material.

I have also provided a temperature reducing mechanism to be used in connection with my invention, and this is best shown in Fig. 2 in which the elements of the hot air engine may conform to the structure shown in Fig. 1, with the exception that in the pipe 11 between the inlet 10 and the turbine 11ª is placed a regenerator 90, and in the pipe 12 between the exhaust and the turbine is a similar regenerator 91. Now, suppose that parts are in proper position, and that fuel is ignited on the cylinder 6 so that the air in the displacer chamber is hot. As soon as the motor is started to run, the air is forced through the regenerator and gives up some of its heat. The cooling of the air causes it to contract and causes a partial vacuum in the displacer chamber. As a result of this, air enters the pipe 12, and imparts movement to the turbine because its pressure is greater than the pressure in the displacer chamber. In performing useful work, the air expands, and for every brake horse power hour of work done by the turbine, the air is cooler by 2552 B. T. U., which under ordinary conditions will cool the air about 22 degrees Fahrenheit. In practice the valve in drain pipe 16 should be opened somewhat so that a flow of water may be maintained from the displacer chamber. This is desirable to keep down temperatures so that the regenerators 90 and 91 will not be choked with condensation. The air may pass from the turbine at about 48 degrees Fahrenheit (assuming the atmosphere to be about 70 degrees Fahrenheit) into regenerator 90 where it will cool the part of this generator nearest the turbine to, say 50 degrees. On the down stroke of the displacer, the air passes up through the regenerator 6, and it will come in contact with successively warmer surfaces, heated up slightly on the up stroke. As it passes through the regenerator and through the fuel bed, it is heated. This heating of the air will expand it, producing pressure in the displacer cylinder so that the air will be forced out through the conduit or conduits through the turbine. In doing this it must first pass through the regenerator 90, which, as stated above was previously cooled to about 50 degrees. In expanding through the turbine, the air will be cooled about 22 degrees, or to about 30 degrees Fahrenheit, and will cool regenerator 91. This will continue until the turbine becomes quite cold, and inasmuch as there is a brine chamber 92, surrounding the turbine casing and having an inlet 93 and an outlet 94, the brine can be reduced enough in temperature to make ice if desired.

Having thus described my invention, what I claim is:

1. The combination with a displacer chamber and an inlet and exhaust port therefor, of a displacer in the chamber the edges of which are spaced from the side wall of the chamber, a liquid seal for said space and means for actuating said displacer.

2. The combination with a displacer chamber having an inlet and exhaust port, of a displacer in the chamber the edges of which are spaced from the wall of the chamber, a regenerator carried by the displacer, a liquid seal for said space and means for actuating said displacer.

3. The combination with a displacer chamber, means for admitting air to and exhausting it from said chamber, of a displacer in the chamber, heat dissipating elements carried by said displacer, a liquid seal between the edge of the displacer and the side wall of the displacing chamber, and means for actuating said displacer.

4. The combination with a displacer chamber having an inlet and exhaust port, of a displacer in the chamber the edges of which are spaced from the side wall of said chamber, a liquid seal for said space, means for actuating the displacer, and a regenerator.

5. In a hot air engine, a displacer chamber to which air may be admitted and from which air may be exhausted by means of a conduit communicating with the atmosphere, means for varying the temperature of the air in said chamber, and a displacer within said chamber comprising a perforate plate, a regenerator on one side of said plate, and heat dissipating elements on the other side of said plate.

6. In a hot air engine, a displacer chamber to which air may be admitted and from which air may be exhausted, means for raising the temperature of the air in the chamber, and a displacer in the chamber and means mounted on the displacer to lower the temperature in said chamber.

7. In combination with a displacer chamber, means for changing the temperature of the air in said chamber, a conduit leading from said chamber to the atmosphere through which the air may exhaust from and be admitted into said chamber, a turbine in the conduit between its inlet and exhaust, and a regenerator in the conduit.

8. In combination with a displacer chamber, means for changing the temperature of the air in said chamber, a conduit leading from said chamber through which the air may exhaust from and be admitted into said chamber, a turbine in the conduit between its inlet and exhaust, and regenerators in the conduits on opposite sides of the turbine.

9. In combination with a displacer chamber, means for changing the temperature of the air in said chamber, a conduit leading from said chamber through which the air may exhaust from and be admitted into said chamber, a turbine in the conduit between its inlet and exhaust, regenerators in the conduits on opposite sides of the turbine, and a brine chamber around the turbine.

10. A turbine having a plurality of ports communicating with it, regenerators in the ports and means for producing an alternating flow through said turbine.

11. In combination with a displacer chamber, means for changing the temperature of the air within the chamber, and a regenerator located within the chamber and consisting of material of low conductivity and provided with substantially smooth and uniform openings for the free passage of air.

12. In a hot air engine, a displacer chamber to which air may be admitted and from which air may be exhausted, means for raising the temperature of the air within the chamber, a displacer in the chamber provided with means for reducing the temperature of the air within the chamber, and a turbine communicating with the chamber and with the atmosphere and having a divided casing with two ports adapted to alternately become inlet and exhaust ports.

13. In a hot air engine, an air chamber, means for alternately heating and cooling the air contained within the chamber, a conduit communicating with the chamber and a turbine communicating with the conduit and with the atmosphere whereby said chamber communicates directly with the atmosphere through the turbine.

14. In a hot air engine, a displacer chamber, a displacer located within the chamber, means mounted on the displacer for alternately heating and cooling the air contained within the chamber, a conduit communicating with the chamber, and power developing means communicating with the conduit and with the atmosphere whereby the chamber communicates with the atmosphere through said means.

In testimony whereof, I have hereunto subscribed my name this 3rd day of July, 1913.

ALEXANDER T. KASLEY.

Witnesses:
H. A. ROPELYE,
B. F. FUNK.